United States Patent [19]

Shuren

[11] Patent Number: 4,782,220

[45] Date of Patent: Nov. 1, 1988

[54] METHOD AND APPARATUS FOR BAR CODE DATA AUTODISCRIMINATION

[75] Inventor: Thomas E. Shuren, Stanhope, N.J.

[73] Assignee: Mars, Incorporated, McLean, Va.

[21] Appl. No.: 913,098

[22] Filed: Sep. 29, 1986

[51] Int. Cl.⁴ ............................................. G06K 7/10
[52] U.S. Cl. .................................... 235/463; 235/466
[58] Field of Search ................ 235/436, 462, 463, 466

[56] References Cited

U.S. PATENT DOCUMENTS

| | | | |
|---|---|---|---|
| 3,784,792 | 1/1974 | Dobras | 235/466 |
| 3,882,464 | 5/1975 | Zamkow | 235/463 |
| 4,032,888 | 6/1977 | Broyles et al. | 340/340 |
| 4,245,152 | 1/1981 | Flurry et al. | 235/466 |
| 4,308,455 | 12/1981 | Bullis et al. | 235/463 |
| 4,354,101 | 10/1982 | Hester et al. | 235/466 |
| 4,414,468 | 11/1983 | Laurer et al. | 235/462 |
| 4,578,570 | 3/1986 | Mazumder et al. | 235/466 |
| 4,687,912 | 8/1987 | Ohta | 235/462 |

*Primary Examiner*—Patrick R. Salce
*Assistant Examiner*—Anita M. Ault
*Attorney, Agent, or Firm*—Davis, Hoxie, Faithfull & Hapgood

[57] ABSTRACT

An improved method and apparatus for the autodiscrimination of barcodes is described. First, an interrupt driven technique for timing the duration of space and bar barcode data is described which allows a microprocessor to decode a first quantum of barcode data during a substantial portion of the time the microprocessor is timing the duration of space and bar data of a second quantum of barcode data. Second, an improved method of locating a barcode margin and eliminating types of barcode to be tried for purposes of decoding is described. Briefly, an integer ratio of space and following bar duration data is compared to a predetermined number, and a determination is made as to whether the space is a margin based on the comparison. Preferably, the two techniques are used in conjunction to speed the autodiscrimination in apparatus for scanning a plurality of different types of bar codes.

13 Claims, 2 Drawing Sheets

METHOD AND APPARATUS FOR BAR CODE DATA AUTODISCRIMINATION

FIELD OF THE INVENTION

The present invention relates generally to an improved method and apparatus for autodiscrimination, and more particularly to such method and apparatus for locating barcode data and distinguishing between a plurality of rapidly scanned bar codes.

DESCRIPTION OF THE PRIOR ART

Bar code symbols consisting of a strip of alternating dark bars and light spaces, and bar code scanners for reading bar codes, have become widely used in many industries for a variety of tasks. A large number of different bar code standards exist. For example, the following codes are widely used: Code 128, Codabar, UPC/EAN, Code 11, Code 93, Interleaved 2 of 5, and Code 3 of 9. In order to have general application, a barcode scanner should be able to discriminate between a plurality of different bar code formats, and be able to do so rapidly.

In the context of decoding bar coded data, autodiscrimination is the process of distinguishing one barcode type from another. Typically, the actual distinguishing is done on a trial and error basis with the more prevalent barcode types tried first.

Typically, when a barcode is scanned, a pulse train is created which represents the dark and light areas of the barcode. The pulse must first be converted to binary data before decoding can take place. In a known technique, a microprocessor is used to time the duration of each pulse. The microprocessor is programmed with a software loop which counts the length of each pulse. Whenever the microprocessor detects a polarity change, the duration of the pulse is stored away and the loop is reset to count the next pulse. Once the scan is complete, the stored binary data is decoded. Decoding must be completed before the next scan.

Using this technique, all of the microprocessor's time is spent timing the pulse train; and the collected data can be decoded only during the time between scans. In a wand type bar code reader, the amount of time between wand scans is generally long enough for autodiscrimination of barcodes using the above technique. If an automatic scanner is used, however, the time between scans is much briefer and may not be long enough for autodiscrimination of a plurality of barcode types.

Additionally, before a barcode can be decoded, the starting point of the code must be found. When a barcode is scanned, any printed material near the barcode may also be scanned and stored away with the barcode in a buffer where data from scanning is stored. The starting point can be buried behind non-data in the barcode buffer. But, all barcodes, by definition, must have areas of space immediately preceding and following the barcode. These areas of space are called margins.

The minimum margin size, as described in the specification for each type of barcode is usually ten times the minimum element width for that barcode. If more than one type of barcode can be scanned and decoded by a barcode scanner, an overall minimum margin for a barcode is defined as the smallest area of space that can be considered a margin for one of the barcode types. For example, barcode type A has a minimum element width of 0.0100 inches and a minimum margin of 0.1 inches. Barcode type B has a minimum element width of 0.0105 inches and a minimum margin of 0.105 inches. The overall minimum margin for a barcode scanner for scanning barcode types A and B is 0.1 inches; ten times the smallest minimum element width of barcode A. It is further recognized, however, that element size can be affected by the distance from which the barcode is scanned. The elements appear narrower as the barcode scanner is moved farther from the barcode. To take this into effect, the overall minimum margin size is calculated as ten times the narrowest element scanned from the furthest distance at which it can be scanned. Any area of space greater than this size is a candidate for a margin.

A further problem arises where it is desired to decode a barcode type with a relatively wide minimum element. If such a code is scanned from close range, its minimum margin is much wider than the overall minimum margin. A space having a width exceeding the overall minimum margin, but which cannot possibly be a margin for this barcode type may be tried as a starting point for the decode. Lower than desirable rates of success in decoding such barcodes result.

The rate of success may also be affected by the number and differences of the types of barcodes to be scanned. Apparatus for decoding two barcode types with similar minimum elements widths should have about the same rate of success for finding a margin, as the same apparatus applied for decoding only one of the two similar minimum width bar codes. If, however, the apparatus is adapted for a third barcode type with a much narrower minimum width than the two similar minimum width barcodes, the rate of success for finding a valid margin for the first two types is lowered. As more barcode types are added, the rate of success for finding a margin may be further lowered.

A low rate of success leads to a speed problem, i.e., if the time it takes to find the margin so that decoding can begin becomes too long, the entire process of decoding may take too long.

SUMMARY OF THE PRESENT INVENTION

The present invention provides method and apparatus for interrupt driven processing of barcode data, for more rapidly locating the margin so that decoding can begin and end more quickly, and for eliminating certain types of barcodes from the decoding process.

The present method of interrupt driven processing of barcode data comprises the steps of using a microprocessor for receiving a first quantum of bar code data comprising a digital pulse train of bar code data; to produce digital data indicative of the duration of a plurality of spaces and bars; to store the digital data from the first quantum of bar code; to receive a second quantum of bar code data; to process the second quantum of bar code data to produce digital data indicative of the duration of a plurality of spaces and bars; and for decoding the stored digital data from the first quantum during a substantial portion of the time during which the second quantum of bar code data is being processed. Data processing is substantially speeded.

The improved method of autodiscrimination of bar code data preferably utilizes the above method to generate bar code data to be stored for decoding. The method for locating a margin more quickly and for limiting the number of barcodes which need to be tried for comparison purposes comprises the steps of storing in memory bar code data comprising space and bar duration data, fetching from memory duration data for a first space from the stored space duration data, fetching form memory duration data for a first bar from the stored bar duration data, computing a first ratio of the duration data for the first space and the first bar, comparing the first ratio with a predetermined number, and determining whether or not the first space is a bar code margin based on the comparison.

Additional details, features and advantages of the present invention are clear from the drawings and the detailed discussion below.

BRIEF DISCUSSION OF THE DRAWINGS

DETAILED DISCUSSION

Interrupt Process

In an automatic barcode scanner such as the barcode scanner discussed in "Portable Data Scanner Apparatus," U.S. application Ser. No. 913,215 filed Sept. 29, 1986, incorporated herein by reference, and assigned to the assignee of the present invention, a beam is typically deflected or scanned from side to side in a more or less continuous manner for a fixed period of time or number of sweeps. The reflected light is collected and processed to create a pulse train representative of the dark and light areas on the scanned surface. This pulse train must be converted to a binary data form for decoding by a microprocessor.

One known way to do this is to watch the pulse train with a microprocessor and "time" the pulse durations with a software loop storing the value on each polarity change. This, however, requires all of the processor's time.

The present invention provides an approach that "frees" the processor by using the microprocessor's hardware timers and interrupt capabilities. It should be noted that these hardware timers are capable of measuring time increments much shorter than the duration of the smallest space or bar to be scanned. By feeding the pulse train and its complement, representing spaces and bars, to the two interrupt pins of the microprocessor (which also gate the internal timers of the microprocessor) the time between pulse transitions can be spent doing other software tasks while the hardware "times" the duration of the incoming signal. This "timing" measures the relative widths of the bars and spaces. When the signal polarity changes, one timer stops the other timer begins, and an interrupt is generated. This process is dependent on relatively uniform scanning velocities being maintained. The interrupt routine simply reads the stopped timer, stores the data away, and clears the stopped timer to ready it for the next cycle. Properly arranged the processor can spend the "free" time between changes of state decoding the past collected data while recording present data in real time.

Figure 1:
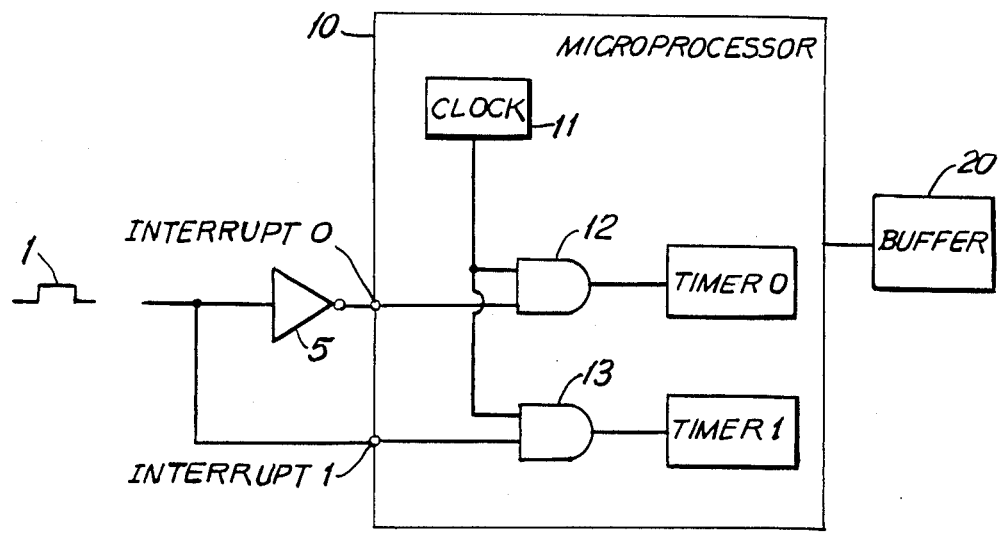
FIG. 1 is a circuit diagram illustrating the interrupt processing technique of the present invention.

FIG. 1 illustrates the interrupt processing technique of the present invention. FIG. 1 shows the hardware interrupt pins, Interrupt 0 and Interrupt 1, of a microprocessor 10. It also shows clock 11, AND gates 12-13, Timer 0 and Timer 1, all of which are internal components located within the microprocessor 10. A pulse train 1 representative of digital bar code data to be decoded is connected to Interrupt 0 through an invertor 5, and pulse train 1 is connected directly to Interrupt 1.

The above described connection of the microprocessor 10 to pulse train 1 is used to time the pulse train. The pulse train 1 is fed to the input of one of the processor's interrupt pins Interrupt 1. The complement of the pulse train is fed to the second interrupt pin Interrupt 0. These interrupts are programmed for edge triggering.

Figure 2:
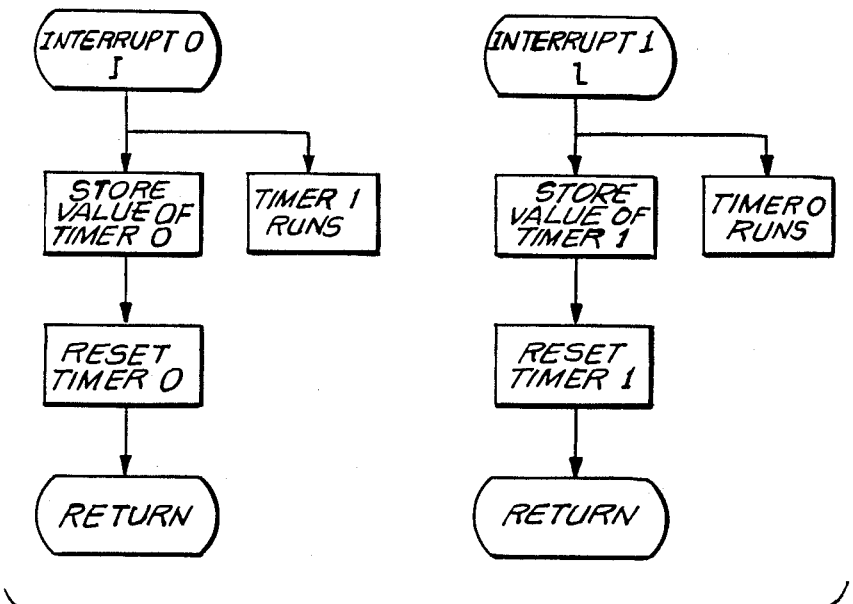
FIG. 2 is a flowchart illustrating the interrupt processing techniques of the present invention.

As illustrated in the flowchart of FIG. 2, the interrupt pins gate the microprocessor's internal timers, Timer 0 and Timer 1. When the pulse train goes low, Timer 0 runs and an interrupt occurs on Interrupt 1. The interrupt routine stores the value of Timer 1 and resets Timer 1. When the pulse train goes high, Timer 1 runs and an interrupt occurs on Interrupt 0. The interrupt routine stores the value of Timer 0 and resets Timer 0.

Since the actual timing of the pulse train 1 is done by hardware, the amount of time the microprocessor 10 can dedicate to decoding is greatly increased. Data collection takes processor time only when an interrupt occurs, in other words, when a change in state in pulse train 1 occurs. While the pulse train is either a steady high or low, the microprocessor 10 is free to decode the data collected during a preceding scan.

Autodiscrimination

Before the barcode data collected using the above method can be decoded, it is necessary to determine where actual bar code data begins and which type of a plurality of types of barcodes has been scanned. To fully appreciate the problems of autodiscrimination a few facts must be known. The barcode being scanned is usually surrounded by other printed material, and consequently, the barcode data to be decoded includes both irrelevant data and actual barcode data. The irrelevant data must be evaluated along with the actual barcode data. Speed may be essential as a scanner may complete a sweep of a barcode in approximately 40 ms. Consequently, 40 ms minus the data collection time is all the time available for a decode. Further, it may be necessary to autodiscriminate at least 7 code types.

Scanned data will typically be stored in a storage buffer. All widely used barcodes require a minimum space on both sides of the barcode, usually on the order of 10 times the minimum element size. This space is called a "margin". Once a margin has been located at attempt to decode the elements following it into a valid barcode can then be made.

One known technique to identify possible margins or margin candidates is to look through the data for any space greater than a particular value, but since scan speed and distance from the target will vary the relative size of the data this is a crude technique. The present technique is to divide the duration of a candidate space by the duration of the bar following it. The resulting ratio can be used to not only decide if it is a valid margin candidate, but also in some cases it can rule out certain barcode types, thereby speeding up the autodiscrimination process.

The basis of the new technique is the ratio of the minimum margin size to the maximum of the first or last bar size. First and last bar size is used because the barcode can be scanned in either direction. The present invention will be discussed further below in the context of autodiscrimination of seven presently commonly used bar code formats. It should be understood that the teaching of the present invention is not limited to these particular barcodes.

The ratios for seven common barcode types are shown below. Through experimentation, the ratios are adjusted to allow variations in the measured bars and spaces due to errors caused by scanning speed variations, variations in bar codes which are scanned on nonflat surface, bar code printing variations, and the like. The following conclusions are drawn between ratio and barcode type:

| Ratio | Barcode Type |
|---|---|
| < 3 | the space cannot be a margin |
| >= 3 & < 4 | Code 128 or Codabar |
| >= 3 & < 6 | UPC/EAN, Code 128 or Codabar |
| >= 6 | UPC/EAN, Code 128, Codabar, Code 11, Code 93, Interleaved 2 of 5, Code 3 of 9 |

If the ratio is less than three, the space cannot be a margin. If the ratio is greater than three and less than four, the space can be a margin for a Code 128 or Codabar barcode only. If the ratio is greater than three and less than six, the space can be a margin for UPC/EAN, Codabar, or a Code 128 barcode only. A ratio for greater than or equal to six means the space can be a margin for any of the seven barcode types.

Figure 3:
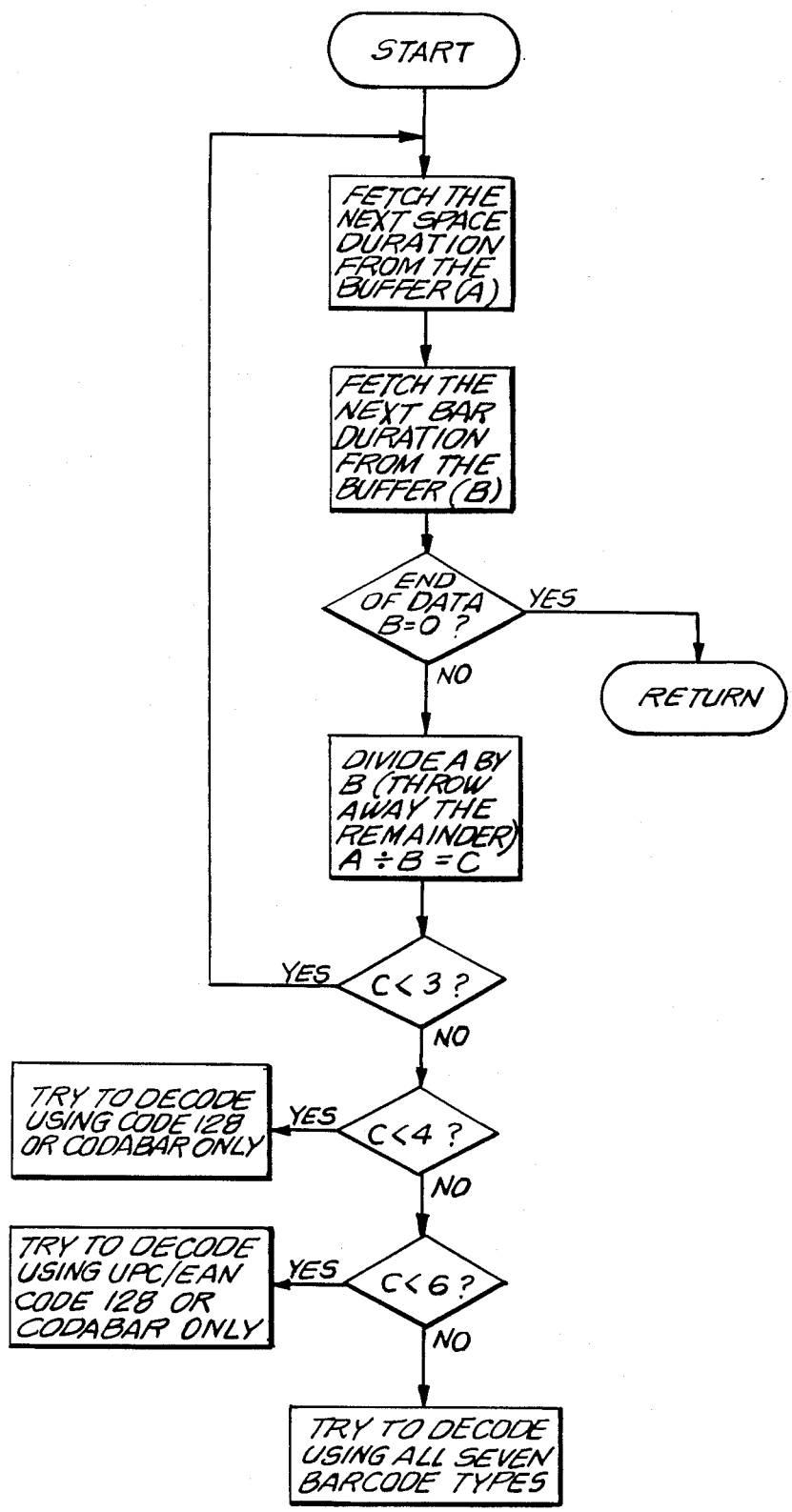
FIG. 3 is a flowchart illustrating the auto-discrimination technique of the present invention.

FIG. 1 shows microprocessor 10 connected to a buffer 20. The buffer 20 stores decode data for various barcodes and barcode data, which is to be decoded. FIG. 3 is a flowchart illustrating the present method for autodiscrimination of the barcode data stored in buffer 20 as applied to decoding the following seven barcodes: Code 128, Codabar, UPC/EAN, Code 11, Code 93, Interleaved 2 of 5, or Code 3 of 9.

The process starts with microprocessor 10 fetching the next space of duration A from the buffer 20. Then, the next bar of duration B is fetched from the buffer 20. Next, it is determined if the end of the data in buffer 20 has been reached by seeing if the bar duration B=0. If not, the ratio C of space duration A and bar duration B is computed. For example, if A=10 and B=3, A divided by B=C=3.3. For ease of calculation, the ratio can be truncated to its integer portion. The result of truncation is C=3.

The next step is to compare the ratio C with a predetermined number, in this case 3. If ratio C is less than 3, it is recognized that the space is not a margin, and the process proceeds to return to the step of fetching the next space duration from buffer 20. If ratio C is not less than 3, the next step is to see if ratio C is less than a second predetermined number, in this case 4.

If ratio C is less than 4, then microprocessor 10 checks the data stored in buffer 20 to see if it is Code 128 or Codabar code, and if it is one of those codes, decodes it. If ratio C is not less than 4, the next step is to compare ratio C with a third predetermined number, in this case 6.

If ratio C is less than 6, then the microprocessor 10 attempts to decode the data in buffer 20 as UPC/EAN, Code 128 or Codabar codes only. Finally, if ratio C is not less than 6, then the microprocessor 10 tries to decode the data using all seven barcode types.

I claim:

1. An improved method of autodiscrimination of barcode data comprising the steps of:

(a) storing in memory of barcode data comprising space and bar duration data;
(b) fetching from memory duration data for a first space from the stored space data;
(c) fetching from memory duration data for a first bar which follows the first space from the stored bar data;
(d) computing a first ratio of the duration data for the first space and the first bar;
(e) comparing the first ratio with a first predetermined number; and
(f) determining whether or not the first space is a bar code margin based on the comparison.

2. The method of claim 1 wherein the step of comparing the first ratio with a first predetermined number further comprises the step of determining if said ratio is less than the predetermined number.

3. The method of claim 2 further comprising the steps of:

(g) comparing the first ratio to see if it is less than a second predetermined number if the first ratio is not less than the first predetermined number; and
(h) decoding the barcode data as if it were a first predetermined type of code if the first ratio is less than the second predetermined number.

4. The method of claim 3 further comprising the steps of:

(i) comparing the first ratio to see if it is less than a third predetermined number if the first ratio is not less than the second predetermined number; and
(j) decoding the barcode data as if it were a second predetermined type of code if the first ratio is less than the third predetermined number.

5. The method of claim 3 wherein the second predetermined number is 4.

6. The method of claim 3 wherein the first predetermined type of code comprises at least the Code 128 and Codabar codes.

7. The method of claim 4 further comprising the step of:

(k) decoding the barcode data as if it were a third predetermined type of code if the first ratio is not less than the third predetermined number.

8. The method of claim 4 wherein the third predetermined number is 6.

9. The method of claim 4 wherein the second predetermined type of code comprises at least the Code 128, Codabar and UPC/EAN codes.

10. The apparatus of any one of claims 1–7 further comprising the step of repeating the method steps other than step (a) by fetching from memory duration data for a second space and a second bar which follows the second space, and computing a second ratio when the first ratio is less than the first predetermined number.

11. The method of claim 1 wherein the first predetermined number is 3.

12. The method of claim 1 further comprising the step of measuring the space and bar data using an interrupt driven measuring technique.

13. An improved method of autodiscrimination using a microprocessor comprising the steps of:

measuring barcode data comprising a digital signal indicative of the duration of a plurality of spaces and bars;
storing measured barcode data in memory; and using the microprocessor to perform decoding of previously stored barcode data;

said step of measuring barcode data comprising the steps of producing a digital pulse train; connecting the pulse train to a first interrupt port and the pulse train inverted to a second interrupt port of the microprocessor; and triggering first and second timers in the microprocessor using the rising and falling edges in the pulse train and the pulse train inverted for timing the duration between the rising and falling edges, and said step of using the microprocessor comprising using the microprocessor to perform decoding of previously stored measured barcode data during the time between the rising and falling edges.

* * * * *